United States Patent [19]
Calltharp et al.

[11] Patent Number: 4,648,967
[45] Date of Patent: Mar. 10, 1987

[54] DECANTING APPARATUS

[76] Inventors: Glen R. Calltharp, 16006 Beckett La., Olathe, Kans. 66062; Kenneth L. Norcross, III, 4933 Wyandotte, Kansas City, Mo. 64112; Dennis L. Nelson, 147 S. Normandy Dr., Olathe, Kans. 66061

[21] Appl. No.: 778,323

[22] Filed: Sep. 20, 1985

[51] Int. Cl.⁴ .............................................. B01D 45/02
[52] U.S. Cl. .................. 210/136; 210/221.1; 210/232; 210/525
[58] Field of Search ...................... 210/525, 136, 221.1, 210/232, 541, 542

[56] References Cited
U.S. PATENT DOCUMENTS

| | | |
|---|---|---|
| 1,203,578 | 11/1916 | Brooks . |
| 3,333,704 | 8/1967 | McGivern et al. . |
| 3,613,889 | 10/1971 | Reed . |
| 3,666,102 | 5/1972 | Blanchard ........................ 210/525 |
| 3,757,953 | 9/1973 | Sky-Eagle, Jr. . |
| 4,290,887 | 9/1981 | Brown et al. . |

OTHER PUBLICATIONS
Technology Evaluation of Sequencing Batch Reactors, James M. Montgomery, Consulting Engineers, Inc. Sep. 1984.

*Primary Examiner*—Frank Sever
*Attorney, Agent, or Firm*—Litman, Day & McMahon

[57] ABSTRACT

A decanting apparatus for a wastewater treatment reactor includes a clarified fluid receiver having fluid receiving ports therein, support structure for maintaining the fluid receiver at a desired level within the reactor and flap means selectively biased to occlude the ports of the receiver during mixing cycles so as to prevent entry of sludge into the receiver and to selectively allow entry of clarified fluid through the ports when the sludge is settled. When the valve is closed, the biasing means urges the flap to reseal the ports of the receivers so that sludge does not enter the receiver during sludge mixing cycles within the reactor. The receiver support structure includes an articulated and flexible joint to connect the receiver to the wall of the reactor, yet allow the receiver to maintain a desired level relative to fluid in the reactor and further maintain the receiver at a desired depth beneath the surface of the liquid level within the reactor to prevent floating debris from entering the receiver.

16 Claims, 8 Drawing Figures

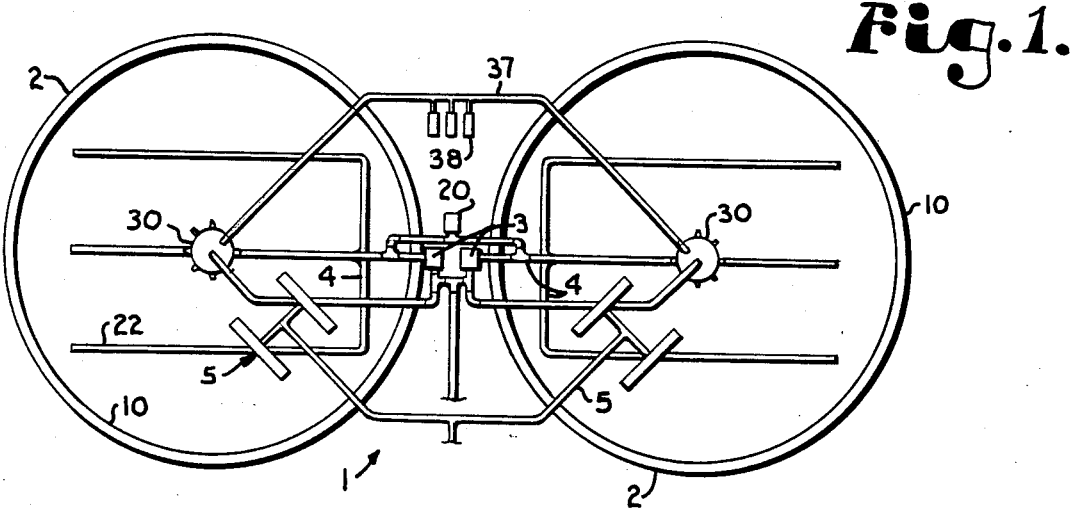
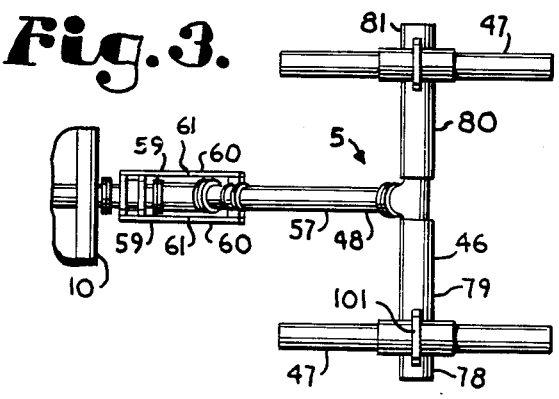
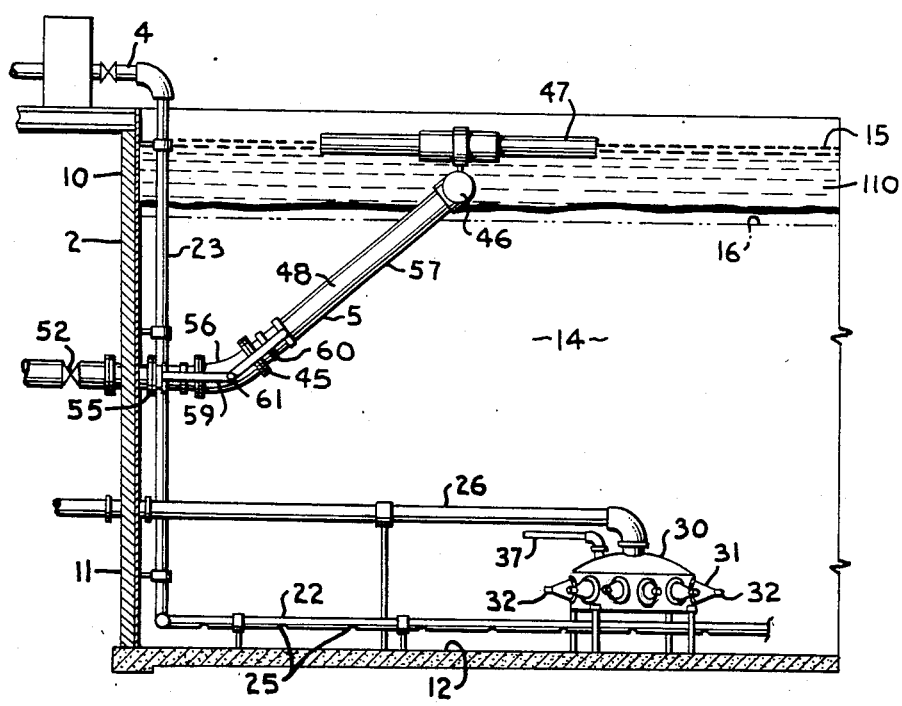

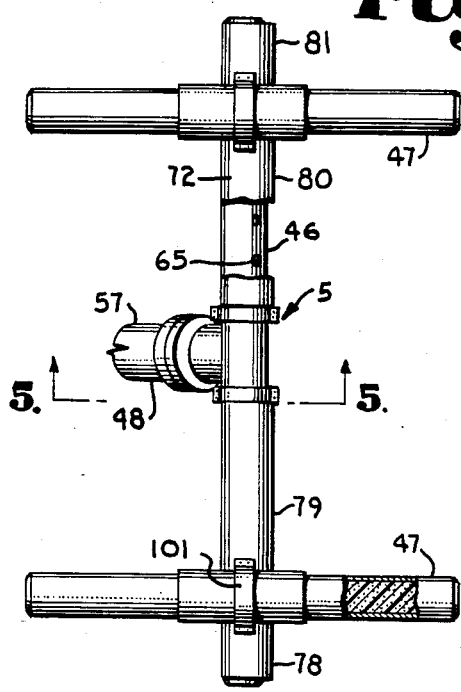
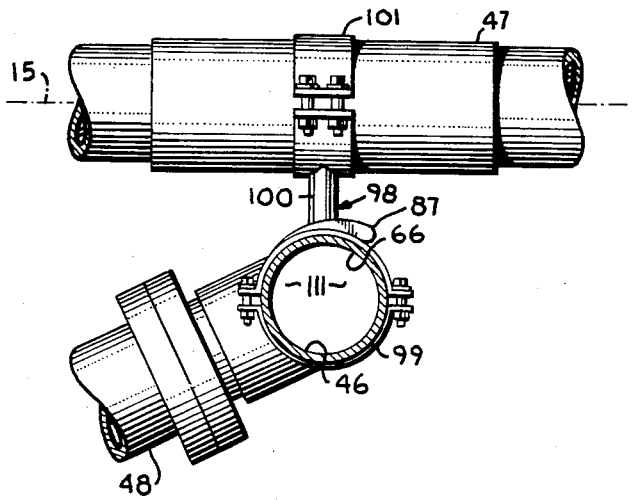
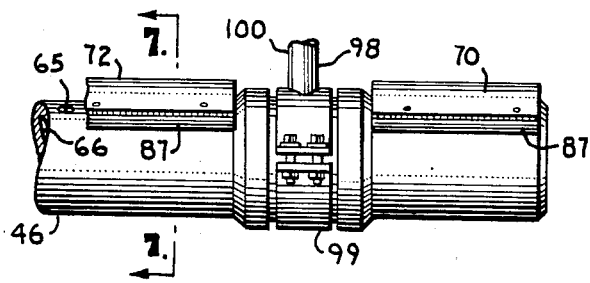
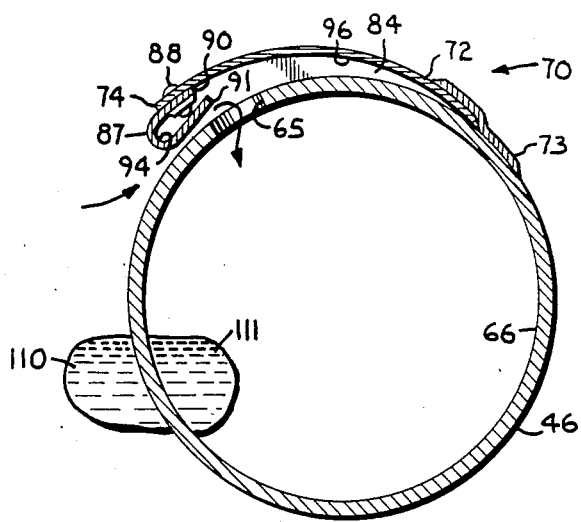
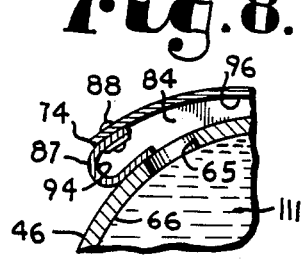

DECANTING APPARATUS

BACKGROUND OF THE INVENTION

The present invention relates to decanter systems and, in particular, to decanter systems for utilization with wastewater treatment reactors.

Certain wastewater treatment processes, especially those utilizing sequential batch reactor techniques or processes, require that clarified fluid be periodically withdrawn from the reactor or digester within which the process is occurring. Such decanters must be functional throughout the year, even in environments where the lower temperature extremes may form ice upon the upper layer of the fluid within the reactor. It is also important that the decanting system not entrain sludge during mix cycles within the reactor or have sludge settle within the decanting system such that when clarified liquid is withdrawn, a certain amount of sludge is withdrawn with the liquid, as such entrainment would discharge highly polluted effluent.

One of the major problems with previous decanter systems for use in batch reactors has been that a receiver for the decanter has had the interior thereof open to the fluid within the reactor during sludge mixing cycles. When the sludge is being mixed with the incoming effluent and the entire reactor is in a generally mixed state, sludge is near the top of the reactor as well as the bottom. If the receiver is open at this time, the sludge usually enters the receiver and settles therein during settling cycles.

Thereafter, when the clarified fluid is withdrawn through the receiver, the sludge that is within the receiver is entrained with the clarified fluid to pollute the effluent. One solution to this problem is to withdraw the clarified fluid with a pump and have a cycle at the beginning of the withdrawl of the clarified fluid in which a certain amount of this fluid is directed back to the reactor so as to return the entrained sludge. Such a solution requires a pump and control mechanism or the like and close control of the recycle of the clarified fluid to the reactor.

Other attempts to resolve the problem of sludge settling within the receiver, have been directed to physically removing the receiver from the tank during mixing cycles. This typically requires a cumbersome and expensive structure which is suitably strong to hold a decanting system out of the reactor fluid during the mix cycle. In addition, where freezing is likely to occur, fluid within the decanting structure may freeze if raised from the liquid in the reactor or, the fluid level at the top of the reactor may freeze which may make it difficult or impossible to raise and lower the decanting structure.

Other problems associated with the decanting structure are that the receiver should be sufficiently spaced from the sludge layer to prevent accidental intake of sludge into the receiver. In addition, the receiver should withdraw clarified fluid in such a manner that the withdrawn fluid does not entrain sludge due to high velocities of the withdrawn fluid coming from near the sludge layer or because the withdrawn fluid is taken from directly above the sludge layer.

Also the support structure for the decanter system must allow for vertical movement of the receiver, as the upper liquid level in the reactor may vary substantially during the different cycles therein. Preferably, the support structure allows the receiver to be supported at a generally fixed height beneath the upper liquid level so as to prevent entrainment of floating debris or scum into the receiver and articulated sufficiently so that the receiver may move freely and smoothly while the upper liquid level is varying.

Certain devices such as one designed by Mandt draw clarified fluid from near the bottom of the reactor so a siphon can control flow. This draws from precisely the region of heavy sludge which should be avoided.

Finally, it is noted that certain prior art decanting systems have incorporated extensive and expensive mechanical devices for manipulating the fluid receiver, sometimes into and out of the liquid layer within the reactor. The complex mechanical devices required for this operation are subject to failure and do not provide a simple and easy method of preventing sludge entry into the receiver. These devices often do not function well, if at all, where ice is floating on or forming upon the upper layer of the reactor.

OBJECTS OF THE INVENTION

Therefore, the objects of the present invention are: to provide a decanting apparatus for use in conjunction with a wastewater treatment facility which is highly effective in preventing sludge from being drawn from the reactor during decanting cycles; to provide a decanting apparatus which is adaptable for use in different climates, especially those climates wherein ice may form on top of the liquid level in the reactor; to provide a decanting apparatus which prevents scum and debris from being withdrawn with the clarified effluent from the reactor; to provide a decanting apparatus which is articulated with respect to the reactor and freely moves vertically to compensate for change in the liquid level within the reactor; to provide a decanting apparatus having a clarified fluid receiver cooperating with a drain to selectively discharge fluid, ports allowing fluid to selectively flow into the receiver and a flap mechanism for selectively covering the ports during sludge agitation within the reactor; to provide a decanting apparatus having a flap mechanism which is normally biased to cover the ports when the drain is occluded and which is opened due to the effect of gravity acting on the fluid in the receiver to produce a substantial differential pressure across the flap mechanism to allow the flow of clarified fluid into the receiver when the drain is opened; to provide a decanting apparatus which is relatively inexpensive, easy to operate, and has a relatively long life expectancy.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a partially schematic top plan view of a wastewater treatment facility showing a pair of wastewater treatment reactors each having a decanting apparatus according to the present invention.

FIG. 2 is an enlarged and partially schematic cross-sectional view of one of the wastewater treatment reactors, showing the decanting apparatus associated therewith.

FIG. 3 is an enlarged and fragmentary top plan view of the decanting apparatus.

FIG. 4 is a further enlarged and fragmentary view of the decanting apparatus similar to FIG. 3 with portions thereof broken away to show detail thereof.

FIG. 5 is an enlarged and fragmentary cross-sectional view of the decanting apparatus, taken along line 5—5 of FIG. 4.

FIG. 6 is an enlarged and fragmentary side elevational view of the decanting apparatus showing a portion of the clarified liquid receiver, closure flaps associated therewith, and a swivel arm for connection to a float assembly.

FIG. 7 is an enlarged, cross-sectional view of the clarified liquid receiver showing a flap assembly in an open position, taken along line 7—7 of FIG. 6.

FIG. 8 is an enlarged, fragmentary and cross-sectional view of the clarified liquid receiver showing the flap assembly and similar to the view of FIG. 7 except the flap assembly is in a closed position.

DETAILED DESCRIPTION OF THE INVENTION

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a wastewater treatment facility including a pair of reactors 2 for treatment of wastewater with microorganisms and aeration, a reciruclation pump 3 with associated manifolds and conduits 4, and a decanting apparatus 5.

Each of the reactors 2 comprises a cylindrical fluid containing tank or reservoir 10 having a side wall 11 and a floor 12. Each reservoir 10 holds wastewater fluid 14 being treated therein and the fluid 14 has a cyclic level which has a normal high mark generally indicated by the reference numeral 15 and a normal low level mark indicated by the reference numeral 16.

Wastewater to be treated enters through filling means such as the manifold 4 generally at the location with the reference numeral 20 and is distributed along the bottom of the reactors 2 by means of trident-shaped distribution conduit 22 flow connecting with the manifold 4 by downcomer 23 and having a plurality of distribution apertures 25 therealong. The distribution conduit 22 also flow connects with the pumps 3 which in turn flow connect with apertures 25 which distribute flow from the pump 3 into a distribution structure 30. The distribution structure 30 has an internal chamber connecting with a plurality of distribution nozzles 31. The nozzles 31 are conical shaped and have discharge openings 32 therein. Piping and valving of each of the pumps 3 may be selectively adjusted so that the pump 3 may draw from the distribution conduit 22 and discharge through the nozzles 31 or draw through the nozzles 31 and discharge through the distribution conduit 22 for cleaning of the nozzles 31, as desired. The piping 4 associated with each pump 3 may also be aligned as sludge removal means to discharge sludge drawn from the conduit 22 to a sludge collection point (not shown), so that sludge may be withdrawn from the reactor 2.

A pressurized air manifold 37 is connected to a compressed air source, such as air compressors 38 and with the distribution structure 30. In this manner, compressed air can be selectively mixed with the wastewater fluid in the distribution structure 30 such that the wastewater exiting the nozzles 32 is highly oxygenated.

Each decanting apparatus comprises support means, such as supporting structure 45, a clarified liquid receiver 46, flotation means, such as floats 47, and a discharge manifold 48. The discharge manifold 48 sealably passes through the associated reactor wall 11 and empties into a municpal sewer, stream or the like (not shown).

The discharge manifold 48 has a control valve 52 positioned therealong vertically spread beneath the normal range of positions for the liquid receiver 46. The valve 52 may be selectively activated to allow or prevent flow through the manifold 48. The support structure 45 is medially mounted upon the wall 11 by a flange unit 55. The flange unit 55 is connected to a flexible tube 56 which in turn is connected to a support conduit 57 which also provides structure for the manifold 48 passing therethrough. Rigid struts 59 and 60 extend from both the flange unit 55 and the support conduit 57 respectfully and are pivotally joined at hinge means such as hinge 61 so that the conduit 57 may be freely articulated about the flange unit 55, especially in a vertical plane.

It is foreseen that a suitable manifold 48 between the wall 11 and the receiver 46 could incorporate flexible tubing along the entire length thereof and have one or more rigid arms medially articulated extending between the wall 11 and the receiver 46 to provide support for the receiver 46.

The illustrated receiver 46 is an elongate tube centrally located relative to the conduit 57 and flow communicating internally therewith. The receiver 46 is generally horizontally positioned and remains horizontally aligned along its axis as the conduit 57 pivots about the flange unit 55 at the hinge 61.

Located at spaced locations along the receiver 46 near the upper side thereof are a plurality of orifices, openings, apertures or ports 65. The ports 65 open into a central collecting chamber or cavity 66 of the receiver 46. It is foreseen that other receiver configurations such as circular or cross-shaped would function as the illustrated elongate tube receiver 46. Similarly, it is foreseen that a wide variety of shapes of apertures would function for the purpose of the present invention, for example, slots.

Flap means, such as flap mechanism 70, are attached to the receiver 46. The flap mechanism 70 includes a relatively inflexible cover plate 72, sealably attached along one side 73 thereof to the receiver 46 and having an opposite side 74 which is spaced from the receiver 46. The cover plate 72 covers, but is spaced from the ports 65. The cover plate 72 includes four separate sections 78, 79, 80 and 81 in the illustrated embodiment and opposite ends of each section has an end plate 84 which seals between the cover plate 72 and the receiver 46.

The flap mechanism 70 also includes a flap 87 attached to the cover plate side 74 by fasteners such as rivets 88. The flap 87 is flexible and resilient in nature. Preferably, the flap 87 is segmented and generally coextensive with the unattached side 74 of each of the cover plate sections 78, 79, 80 and 81. The flap 87 has an attached side 90 and an opposite side 91 and is U-shaped or otherwise bent back upon itself such that the flap unattached side 91 is biased or urged against the receiver 46 by the resiliency of the flap 87. When the flap 87 is positioned between the cover plate 72 and the receiver 46, it is somewhat compressed to provide for the biasing effect, but not so much as to make the flap unattached side 91 unmoveable. A flap 87 constructed of buna-N rubber has proved satisfactory for this purpose. However, a bend 94 in the flap 87 is necessarily loose enough to allow the flap side 91 to move away from the receiver 46 when external water pressure is exerted against one side and a partial vacuum against the opposite side so as to provide a substantial differential pressure gradient across the flap 87, as the valve 52 opens and drains the receiver 46. When the flap end 91 is against the receiver 46, the flap cover plate 72 and end plates 84 cooperate to prevent external water from entering a cavity 96 formed thereby and hence from entering the ports 65. It is foreseen that the cavity 96 may provide the function of the ports 65 so that the aperture blocked by the flap means would be the space between the receiver 46 and the cover plate 72, thereby rendering the illustrated ports unnecessary. The illustrated flap 87 is positioned and constructed so as to not provide a ledge, lip or other collection point for sludge to accumulate during mixing. In particular, the receiver 46 slopes downwardly at the location where it is engaged by the flap 87 so sludge is urged to fall to the bottom of the reactor 2 rather than collect at that location.

It is also foreseen that other types of flaps could be utilized for the purpose described, that is, to prevent flow of fluid across the opening occluded by the flap and into the clarified fluid receiver when the clarified fluid discharge is blocked or shut off such that the clarified fluid in the receiver becomes stagnant and reaches general equilibrium with the fluid outside of the receiver. On the other hand, when the drain on the receiver is open so that the clarified fluid can drain therefrom, a partial vacuum may be produced within the receiver and there is a differential pressure on opposite sides of the flap created by fluid pressure exterior of the receiver and this vacuum. At this time, the flap should open to allow clarified fluid to enter the receiver. The flap is therefore biased to prevent fluid from entering the receiver when draining is not desired and swings open to allow passage of clarified fluid into the receiver when draining is desired.

Connected to the receiver 46 near opposite ends thereof are the floats 47. The illustrated floats 47 are elongate foam filled tubes which are connected near their center to the receiver 46 by swivel connectors 98. Each of the swivel connectors 98 include a flange member 99 slidably encircling the manifold 46, a connecting link 100, and a second flange member 101 surrounding an associated float 47. The floats 47 are allowed to pivot or swivel freely relative to the receivers 46 upon the swivel connectors 98 such that the floats 47 may remain relatively horizontally aligned on the fluid surface. The floats 47 are vertically spaced above the receiver 46 by the links 100 and, in this manner, the floats 47 remain close to or at the upper fluid level in the reactor 2 whereas the receiver 46 remains spaced somewhat below the upper fluid level to prevent scum and floating debris from entering the ports 65.

In use, a reactor 2 is typically partially prefilled with fluid to a level such as noted at 16 from previous usage and this includes a substantial amount of activated sludge within the fluid 14. Additional wastewater to be treated is added to the reactor to bring the fluid level up to the location noted by the reference numeral 15. Thereafter, the fluid is agitated and/or aerated in accordance with the desired sequential batch reactor treatment, after which all agitation of the liquid 14 is stopped, so that the sludge therein may settle to the bottom. There then remains a clarified liquid layer 110 at the top of the reactor 2 such as between the levels as indicated by the reference numerals 15 and 16. During agitation, the valve 52 is closed and clarified liquid 11 is allowed to stagnate within the support conduit 57 and receiver 46. As the differential pressure between the inside of the receiver 46 and the exterior thereof is approximately the same when the valve 52 is closed, the flap 87 closes or seals against the receiver 46, as seen in FIG. 8, so as to operably prevent fluid 110 inside the reactor 2 from entering the collection cavity 66 of the receiver 46.

When it is desired to drain the clarified fluid 110, the valve 52 is opened so that held clarified fluid 11 drains from the conduit 57 and the receiver 46. This produces a partial vacuum within the receiver 46 and a substantial differential pressure across the flap 87 between the interior and exterior of the receiver 46. The flap unattached end 91 then swings about the bend 94 up and away from the receiver 46 such that clarified fluid may flow beneath the flap 87, as seen in FIG. 7, and through the cavity 96, thereafter through the port 65, and thereafter into the cavity 66 of the receiver 46 for eventual discharge through the conduit 57 and valve 52. The valve 52 remains open until the clarified fluid 110 is drained to a desired level, after which the valve 52 is shut. At this time, the flap 87 reseals against the receiver 46 to prevent flow of additional clarified fluid 110 into the receiver cavity 66.

It is to be understood that while certain forms of the present invention have been illustrated and described herein, it is not to be limited to the specific forms or arrangement of parts described and shown.

What is claimed and desired to be secured by Letters Patent is as follows:

1. A decanting apparatus for removing an upper fluid layer from a wastewater treatment reservoir; said apparatus comprising:
    (a) a fluid receiver having an interior chamber;
    (b) support structure means for mounting said receiver in the reservoir; said support structure means cooperating with said receiver for maintaining said receiver at a generally constant depth relative to an upper fluid level within the reservoir during decanting;
    (c) an aperture in said receiver for communicating between said reciever interior chamber and fluid in the reservoir;
    (d) means designed for preventing sludge from entering said interior chamber when not decanting including:
        (1) flap means selectively covering said receiver aperture; and
        (2) biasing means cooperating with said flap means to selectively cover said aperture when not decanting such that said flap means operatively prevents entry of fluid into said receiver through said aperture when decanting is not occurring and such that said flap means allows flow of fluid into said chamber through said aperture when decanting is occurring, and for preventing substantial quantities of sludge from accumulating in said receiver when fluid in said reservoir containing sludge is being agitated between decanting periods.

2. An apparatus according to claim 1 including:
(a) a drain communicating with said chamber; and
(b) a valve in said drain; said valve being positioned below said flap means such that when said valve is open, fluid gravity flows from said chamber such that fluid external of said chamber exerts a positive pressure on said flap means and thereby opens said flap means so as to allow fluid external of said chamber to flow into said chamber through said aperture and when said valve is closed said flap means is urged by said biasing means to cover said aperture and prevent external fluid from entering said chamber.

3. The apparatus according to claim 1 wherein said support structure comprises:
(a) an elongate drainage conduit operably flow connected to said receiver at one end and adapted for passing through a wall of the reservoir at an opposite end;
(b) hinge means on said conduit to allow said conduit to swing in a vertical plane; and
(c) float means connected to said receiver and maintaining said receiver at a relatively fixed depth relative to an upper level of fluid in which the apparatus is submerged.

4. The apparatus according to claim 3 in combination with a wastewater treatment reservoir.

5. The apparatus according to claim 1 wherein:
(a) said float is attached to said receiver by a swivel connector and is spaced vertically above said receiver so as to maintain said receiver at a fixed relative position beneath the surface of a liquid in which said apparatus is located.

6. The apparatus according to claim 5 wherein:
(a) said flap means includes a cover plate attached near one end thereof to said receiver and near an opposite end thereof to said flap member;
(b) said cover plate being spaced from but in covering relation to said aperture; and
(c) said flap member being generally U-shaped and being attached along one side thereof to said cover plate and having an opposite side biased to engage said receiver.

7. The apparatus according to claim 1 wherein said receiver comprises:
(a) an elongate tube having a central cavity and an aperture opening into said cavity.

8. The apparatus according to claim 7 wherein said flap means comprises:
(a) a flexible and resilient flap member positioned such that the resiliency of said member normally biases said member toward said receiver.

9. In a decanting apparatus for selectively removing a clarified fluid from a wastewater treatment reservoir wherein the fluid is alternatively agitated with sludge and settled; said apparatus including a receiver, a support structure for said receiver and a drain communicating with a collecting chamber in said receiver; the improvement wherein:
(a) said receiver includes an aperture communicating between said chamber and an exterior thereof; and including
(b) a flap cooperatively positioned relative to said aperture to selectively block flow of fluid through said aperture when said reservoir is being agitated for substantially preventing sludge from entering said receiver during agitation of said reservoir and for alternatively allowing flow of fluid through said aperture into said reservoir during decaning.

10. The apparatus according to claim 9 including:
(a) biasing means for continuously urging said flap to block flow through said aperture in such a manner that flow may occur if such urging is overcome by a pressure differential across said flap.

11. The apparatus according to claim 10 wherein:
(a) said flap is U-shaped, compressed and resilient such that the resiliency of said flap inherently functions as said biasing means.

12. The apparatus according to claim 10 wherein:
(a) said drain includes a valve; and
(b) said biasing means urges said flap to prevent fluid flow into said aperture when said drain valve is closed and said biasing means allows said flap to open to allow flow of fluid through said aperture and out said drain when said valve is open.

13. The apparatus according to claim 12, wherein:
(a) said valve is positioned lower than said flap such that when said valve is open, fluid in said drain exits said drain and fluid surrounding said receiver creates a positive pressure on said flap so as to open said flap and allow flow of fluid through said receiver into said drain.

14. The apparatus according to claim 13 wherein:
(a) said flap means includes a cover plate attached near one end thereof to said receiver and near an opposite end thereof to said flap member;
(b) said cover plate being spaced from but in covering relation to said aperture; and
(c) said flap member being generally U-shaped and being attached along one side thereof to said cover plate and having an opposite side biased toward said receiver.

15. A sewage treatment system comprising:
(a) a reservoir suitable for holding a wastewater fluid for treatment therein;
(b) filling means for placing additional wastewater fluid in said reservoir;
(c) sludge removal means for removing sludge concentrated from said wastewater fluid from said reservoir; and
(d) a decanting apparatus for removing clarified fluid from said reservoir; said decanting apparatus comprising:
(1) a fluid receiver having an interior chamber;
(2) support structure means for mounting said receiver in the reservoir; said support structure means cooperating with said reservoir for maintaining said receiver at a generally constant depth relative to an upper fluid level within said reservoir during decanting;
(3) an aperture in said receiver for communicating between said interior chamber and fluid in said reservoir;
(4) flap means selectively preventing flow of fluid from said reservoir into said receiver aperture; and (5) biasing means cooperating with said flap means to selectively prevent flow of fluid through said aperture during agitation of the fluid in said reservoir with sludge such that said flap means operatively prevents entry of substantial amounts of sludge into said receiver through said aperture when decanting is not occuring and such that said flap means allows flow of fluid into said receiver through said aperture after agitation has stopped and said sludge has settled and when decanting is occurring and for precluding the collection of substantial quantities of sludge in said receiver prior to decanting and thereafter withdrawn with decanted fluid.

16. A sewage treatment system comprising:
    (a) a reservoir suitable for holding a wastewater fluid for treatment therein;
    (b) filling means for placing additional wastewater fluid in said reservoir;
    (c) sludge removal means for removing sludge concentrated from said wastewater fluid from said reservoir; and
    (d) a decanting apparatus for removing clarified fluid from said reservoir; said decanting apparatus comprising:
        (1) a fluid receiver having an interior chamber;
        (2) support structure means for mounting said receiver in the reservoir; said support structure means cooperating with said reservoir for maintaining said receiver at a generally constant depth relative to an upper fluid level within said reservoir during a decanting cycle; said support structure means comprising:
            (i) an elongate drainage conduit operably flow connected to said receiver interior chamber at one end and passing through a wall of said reservoir at an opposite end;
            (ii) hinge means on said conduit to allow said conduit to swing in a vertical plane relative to said wall; and
            (iii) float means connected to said receiver for maintaining said receiver at a relatively fixed depth with respect to an upper level of fluid in which the apparatus is submerged;
        (3) an aperture in said receiver for communicating between said receiver interior chamber and fluid in the reservoir;
        (4) flap means selectively preventing flow of fluid from said reservoir into said receiver aperture; said flap means comprising:
            (i) a flexible and resilient flap member positioned such that the resiliency of said member normally biases said member to such a position to prevent flow of fluid through said aperture;
            (ii) said flap means includes a cover plate attached near one end thereof to said receiver and near an opposite end thereof to said flap member;
            (iii) said cover plate being spaced from but in covering relation to said aperture; and
            (iv) said flap member being generally U-shaped and being attached along one side thereof to said cover plate and having an opposite side biased to engage said receiver; and
        (5) biasing means cooperating with said flap means to selectively prevent flow of fluid into said aperture during agitation of fluid with sludge in said reservoir such that said flap means operatively prevents entry of fluid into said receiver chamber through said aperture when substantial quantities of sludge are present throughout said fluid and when decanting is not occurring and such that said flap means allows flow of fluid from an upper portion of said reservoir into said receiver chamber through said aperture when agitation is stopped and sludge is settled to a lower portion of said reservoir and, when decanting is occurring, for precluding entry of a substantial amount of sludge into said receiver.

* * * * *